Nov. 21, 1950     S. M. MARCO ET AL     2,531,145
ELECTRICAL RESISTANCE MEASUREMENT
Filed March 21, 1947
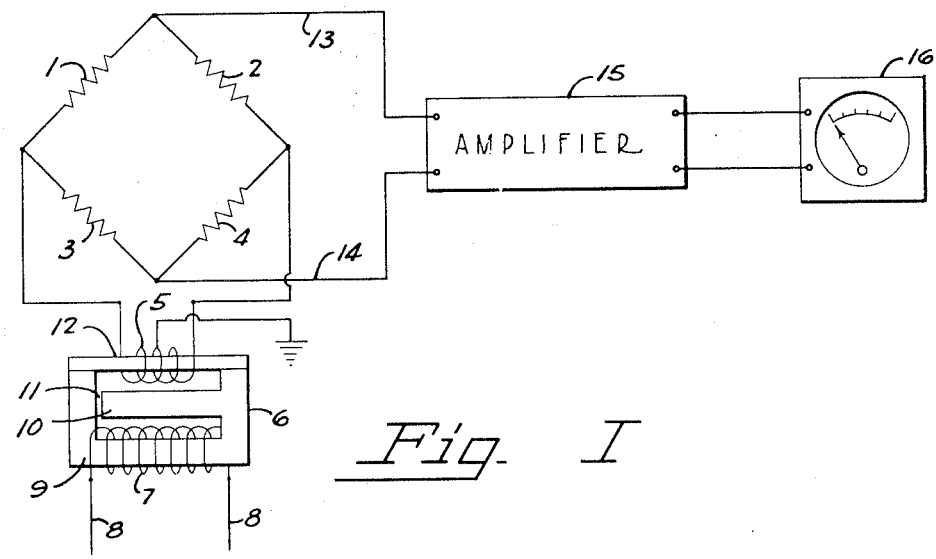
Fig. I
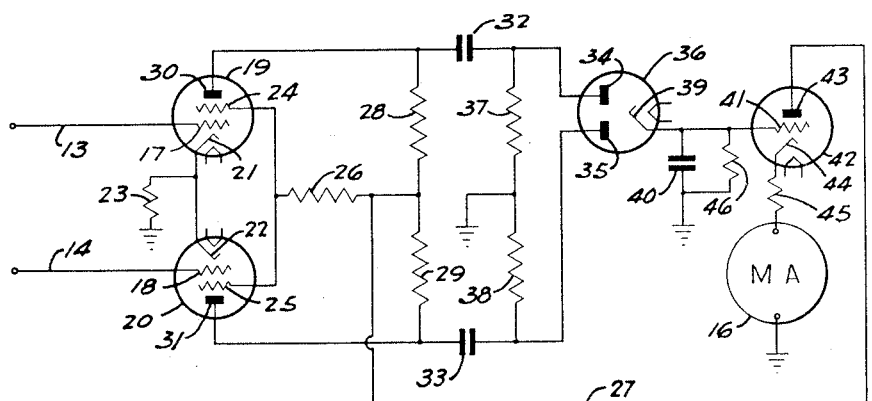
Fig. II
Salvatore M. Marco
Wells L. Davis
INVENTORS
BY
Marshall and Marshall
ATTORNEYS Patented Nov. 21, 1950

2,531,145

UNITED STATES PATENT OFFICE 2,531,145

ELECTRICAL RESISTANCE MEASUREMENT

Salvatore M. Marco and Wells L. Davis, Columbus, Ohio, assignors to Toledo Scale Company, Toledo, Ohio, a corporation of New Jersey Application March 21, 1947, Serial No. 736,144

1 Claim. (Cl. 175—183)

This invention relates to stress measurement by means of strain sensitive resistance wires and in particular to a method of increasing the apparent sensitivity of such measurement without increasing the power input into the strain sensitive wires.

Resistance wire gauges that are used for measuring the strain in structural members have limited power dissipation capacity. If this limit is exceeded the accuracy of indication is adversely affected by the resulting temperature errors.

It is the object of this invention to provide an apparatus for increasing the apparent sensitivity of an electrical resistance measurement without increasing the power input into the circuit.

Other objects and advantages are apparent from the following description in which reference is made to the accompanying drawing.

According to the invention the sensitivity of an electrical bridge circuit or resistance measuring circuit may be increased by energizing the circuit by means of an alternating current voltage having a high ratio of peak to effective, i. e. root mean square, value and of measuring the output voltage of the circuit by means of a vacuum tube voltmeter or similar device that is sensitive to and reads the peak value of the alternating current voltage.

The invention further contemplates the use of a saturable core transformer for obtaining a voltage that has a high ratio of peak to effective value.

A preferred embodiment of the invention is illustrated in the accompanying drawing.

In the drawing:

Figure I is a schematic diagram of an electrical bridge circuit connected according to the invention.

Figure II is a schematic diagram of a vacuum tube voltmeter that is suitable for use for detecting bridge unbalance.

The specific figures and the accompanying description are intended merely to illustrate the invention but not to impose limitations on the claims.

According to the invention an electrical bridge circuit comprising resistors 1, 2, 3 and 4 of limited power dissipating capacity is energized from a secondary winding 5 of a saturable core or peaking transformer 6 that has a primary winding 7 connected through leads 8 to a source of alternating current power. The core of the transformer 6 includes a first leg 9 on which the primary winding is wound and a center leg 10 that completes a magnetic circuit for a primary winding with the exception of an air gap 11 between the end of the center leg 10 and one of the end members of the transformer core. The secondary winding 5 is wound on another leg 12 of the transformer 6 which other leg has small cross sectional area and is made of a material having great permeability so that it is easily saturated with magnetic flux.

When such a transformer is energized with alternating current and the magnetic flux density is low, as when the current is passing through zero, the magnetic flux from the core 9 also passes through the high permeability core leg 12 and the change in this flux generates a voltage in the secondary winding 5. If the flux density increases because of an increased current in the primary winding 7, the high permeability leg 12 of the transformer saturates so that little additional flux can pass through it and the remaining flux then is forced through the center leg 10 and across the air gap 11. Under this saturated condition there is very little change in flux in the high permeability leg 12 and, consequently, very little voltage generated in the secondary winding 5. The output of the saturable core transformer 6 therefore consists of a series of voltage impulses which impulses are produced when the flux in the leg 9 passes through zero. The unbalance voltage from the bridge circuit that appears between leads 13 and 14 consists of a series of pulses, the amplitudes of which are proportional to the unbalance existing in the bridge circuit. These impulses are amplified and rectified by an amplifier 15, the output of which is applied to an indicating meter 16.

Figure II is a schematic wiring diagram of the amplifier 15. The leads 13 and 14 from the bridge circuit are connected to grids 17 and 18 of a pair of amplifier tubes 19 and 20. Cathodes 21 and 22 of the amplifier tubes are connected together and are connected through a common cathode resistor 23 to ground. Screen grids 24 and 25 of the amplifier tubes are connected together and are connected to a common screen resistor 26 to a positive high voltage lead 27. Current also flows from the high voltage lead 27 through plate resistors 28 and 29 to plates 30 and 31 of the amplifier tubes 19 and 20 respectively.

The use of a common cathode resistor and a common screen resistor serves to reduce the sensitivity of the amplifier to changes in supply voltage without decreasing the sensitivity of the amplifier to the voltages obtained from the unbalance voltage of the bridge. The output of the amplifier tubes 19 and 20 is transmitted through condensers 32 and 33 to plates 34 and 35 of a rectifier tube 36. The plates 34 and 35 are also connected to ground through high resistances 37 and 38. Amplifier output voltages are applied to the plates 34 and 35 which on the positive half cycles pass current to a cathode 39 of the rectifier tube 36 to charge a condenser 40 to a potential nearly equal to the peak potential of the amplified signal. The potential on the condenser 40 is transmitted to a grid 41 of an amplifier tube 42, the plate 43 of which is connected to the high voltage lead 27. The cathode 44 of the tube 42 is connected through a resistor 45 and the meter 16 to ground. A high resistance 46 connected in parallel with the rectifier condenser 40 serves to slowly discharge the condenser 40 and thereby permit the meter to follow a decrease in input signal.

If one stage of amplification is insufficient to give the desired sensitivity, more stages may be connected in cascade to increase the available signal to a level sufficiently high to energize the indicating meter.

Power for the high voltage lead 27 is secured from a rectifier and filter that includes a power transformer 47 the primary 48 of which is energized from an alternating current source of power and the secondaries 49, 50 and 51 of which serve as rectifier filament supply, rectifier plate supply and amplifier filament supply. The secondary winding 49 is connected to a filament 52 of a rectifier tube 53 while the high voltage winding 50 has its center tap grounded and its ends connected to plates 54 of the rectifier tube 53. One side of the filament 52 of the rectifier tube is connected through a resistance-capacitance filter 55 to the lead 27.

The proportional increase in sensitivity that may be obtained without increasing the heat input, i. e., the power input, to a resistance bridge is determined by the ratio of the peak value of the voltage to the effective or root mean square voltage. The meter deflection is proportional to the peak voltage while the heat input to the bridge is proportional to the effective value of the voltage. For a commercial sine wave voltage, the ratio of the peak value to the effective value is very nearly 1.4 to 1. By using a saturable core transformer the ratio of peak to effective voltage may be greatly increased.

The saturable core transformer 6 is preferred as a source of voltage having a high ratio of peak to effective voltage and is intended to be typical of various generators that may be used to secure such a voltage.

Other modifications may be made in the structure shown and still obtain the advantages of exciting an electrical bridge with a voltage having a high ratio of peak to effective values.

Having described the invention, we claim:

In an electrical measuring circuit employing a Wheatstone bridge of limited power dissipating capacity, a saturable core transformer having its secondary connected to one diagonal of the bridge, an amplifier connected to the other of the diagonal of the bridge, a rectifier connected to the output side of the amplifier, and a vacuum tube voltmeter operatively connected to the rectifier to indicate the voltage delivered by the rectifier.

SALVATORE M. MARCO.
WELLS L. DAVIS.

REFERENCES CITED

The following references are of record in the file of this patent:

UNITED STATES PATENTS

| Number | Name | Date |
|---|---|---|
| 1,665,397 | Wunsch | Apr. 10, 1928 |
| 2,037,799 | Koch | Apr. 21, 1936 |
| 2,350,545 | Bradford | June 6, 1944 |
| 2,379,462 | Spencer | July 3, 1945 |
| 2,395,881 | Klemperer | Mar. 5, 1946 |
| 2,401,424 | Hershberger | June 4, 1946 |
| 2,466,746 | Shive | Apr. 12, 1949 |
| 2,467,856 | Rich | Apr. 19, 1949 |